(12) United States Patent
Fontijn

(10) Patent No.: US 7,188,766 B2
(45) Date of Patent: Mar. 13, 2007

(54) ITEM IDENTIFICATION USING ELECTRONIC TAGS

(75) Inventor: Wilhelmus Franciscus Johannes Fontijn, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 10/531,614

(22) PCT Filed: Sep. 22, 2003

(86) PCT No.: PCT/IB03/04212

§ 371 (c)(1),
(2), (4) Date: Apr. 14, 2005

(87) PCT Pub. No.: WO2004/636490

PCT Pub. Date: Apr. 29, 2004

(65) Prior Publication Data

US 2006/0016886 A1 Jan. 26, 2006

(30) Foreign Application Priority Data

Oct. 18, 2002 (EP) ................... 02079335

(51) Int. Cl.
*G06Q 30/00* (2006.01)

(52) U.S. Cl. ...................... 235/385; 235/492

(58) Field of Classification Search ............ 235/385, 235/492

See application file for complete search history.

(56) References Cited

U.S. PATENT DOCUMENTS

| 5,640,002 | A | 6/1997 | Ruppert et al. |
| 6,354,493 | B1 | 3/2002 | Mon |
| 7,032,820 | B2 * | 4/2006 | Kreiner et al. ............. 235/385 |
| 2002/0143860 | A1 | 10/2002 | Catan |

* cited by examiner

*Primary Examiner*—Michael G. Lee
*Assistant Examiner*—Kristy A. Haupt
(74) *Attorney, Agent, or Firm*—Yan Glickberg

(57) ABSTRACT

The present invention relates to a method and a system for identifying an item (1) to which a radio frequency tag is attached by means of a radio frequency tag detector (101), wherein radio frequency contact is established between the tag and the detector (101) and information associated with the item (1) and being stored by the tag is received by the detector (101) The invention is based on the idea that the data stored by the tag is mapped against a unique item identifier. This unique item identifier is then presented for a user of the detector (101). By employing the present invention, it is possible to identify an item (1) by attaching a small tag to it. This is particularly advantageous in the case where the item (1) to which the tag is attached is very small, such that it is practically difficult to write information on the item (1) itself or on the item casing.

19 Claims, 4 Drawing Sheets

ITEM IDENTIFICATION USING ELECTRONIC TAGS

The present invention relates to a method for identifying an item to which a radio frequency tag is attached by means of a radio frequency tag detector, wherein radio frequency contact is established between the tag and the detector and information identifying the item and being stored by the tag is received by the detector and a system for identifying an item to which a radio frequency tag is attached, the system comprising a radio frequency tag detector arranged to establish radio frequency contact with the tag and being arranged to receive information stored by the tag identifying the item.

Usually, items such as optical discs, books, DVDs etc. are identified by studying the item itself or the cover or the back of the item. An identifier such as title, author, artist or some other identification criteria is normally printed or written on the item.

As items such as optical discs and other storage media are becoming smaller and smaller, it is becoming more difficult to provide the item with visual identification that is convenient to interpret or read out. Possibly, optical discs or other media recordable by a user might be to small to write on using a pen. To overcome this problem, the item can be electronically tagged, i.e. a chip capable of radio frequency (RF) emission can be embedded in a tag that is attached to the item. The chip stores data associated with the item and an RF tag detector is used to scan the tag for information. The data stored can easily be modified. Normally, the detector is directed against the tag and the detector transmits a scan signal of a certain frequency which is received by the tag whereupon the chip embedded in the tag sends a response signal to the detector. The response signal comprises some type of identifier for identification of a certain tagged item. The detector demodulates the response signal and obtains the identifier. By using these RF tags, it is possible to associate information with an item although the item is very small, since tags also can be made very small.

A system and method for finding a specific RF tagged article located in a plurality of RF tagged articles is shown in U.S. Pat. No. 6,354,493. The document discloses a system wherein a specific search criteria related to a tagged item is input to a tag detector. The detector scans a number of tagged items and when the criteria is met, i.e. when the tag of an item comply with the search criteria, a processor generates a feedback signal comprising audible sounds which will indicate to a user where an item meeting the search criteria is located. However, in this system, since a search criteria must be entered before a meaningful scanning operation can take place, a user of the system must have some knowledge about the type of item to be found.

An object of the present invention is to solve the problem of how to provide identification of RF tagged items without any knowledge of the item to which the tag is attached.

This object is achieved by a method for identifying an item to which a radio frequency tag is attached by means of a radio frequency tag detector, wherein radio frequency contact is established between the tag and the detector and information identifying the item and being stored by the tag is received by the detector according to claim 1 and a system for identifying an item to which a radio frequency tag is attached, the system comprising a radio frequency tag detector arranged to establish radio frequency contact with the tag and being arranged to receive information stored by the tag identifying the item according to claim 5.

According to a first aspect of the invention, a method is provided wherein a unique item identifier is mapped against the information stored by the tag and received by the detector. The unique item identifier is then presented for a user of the detector.

According to a second aspect of the invention, the system comprises a first means arranged to map a unique item identifier against the information stored by the tag and received by the detector. The system further comprises a second means arranged to present the unique item identifier for a user of the detector.

The invention is based on the idea that an RF tag is attached to an item. The tag contains data identifying the item to which the tag is attached. An RF tag detector is operated to establish RF contact with the item tag. When contact is established, the detector receives the data stored by the tag. The data stored by the tag is mapped against a unique item identifier. This unique item identifier is then presented for a user of the detector.

By employing the present invention, it is possible to identify an item by attaching a small tag to it. This is particularly advantageous in the case where the item to which the tag is attached is very small, such that it is practically difficult to write information on the item itself or on the item casing. The item typically comprises music/video media but could also comprises memory sticks, flash cards etc. Currently, optical storage media such as the small form factor opticals based on blue laser technology from Philips are items which suitably could be tagged, but any type of item could be tagged such as books, CDs, DVDs etc. Each tagged item can be uniquely identified in that the information stored in the tag, for example an ID number, is mapped against a unique item identifier. This mapping can be performed in the RF detector, in which case the unique item identifier is stored in the detector. The unique item identifier can alternatively be stored in a memory associated with some processing means connected to the detector such as a computer, a PDA or the like. The actual mapping is then performed in the processor. The processing means can be connected to the detector via wire or RF.

According to an embodiment of the invention, the RF tag detector is arranged with some loudspeaker means and maps the tag information against a unique item identifier in the form of an audio signal. This audio signal is presented to the user via the detector loudspeaker. If the detector is connected to a computer, the mapping takes place in the computer, and the computer loudspeakers can be used. This implies that the detector not necessarily must be equipped with loudspeakers for the system to accomplish an audio item identifier. An audio output is advantageous since a tune or a melody can be associated with a tagged item. For example, if a user scans the tag of an optical disc containing music performed by The Beatles, the group's tune "Strawberry Fields Forever" can, if desired, be heard through the loudspeakers. This is furthermore particularly advantageous in case the user is visually impaired.

According to another embodiment of the invention, the RF tag detector is arranged with some displaying means and maps the tag information against a unique item identifier in the form of a displayable signal. This displayable signal is presented to the user via the detector displaying means. If the detector is connected to a computer, the mapping takes place in the computer, and the computer screen can be used. This implies that the detector not necessarily must be equipped with displaying means for the system to accomplish a visual item identifier. A visual output is advantageous since still or moving pictures can be associated with a tagged item. For example, if a user scans the tag of an optical disc, a DVD or a book containing Elvis material, a picture showing Elvis can be displayed. This is furthermore particularly advantageous in case the user is hearing-impaired.

The detailed description of embodiments of the invention will be given with reference to the accompanying drawings, in which.

Figure 3:
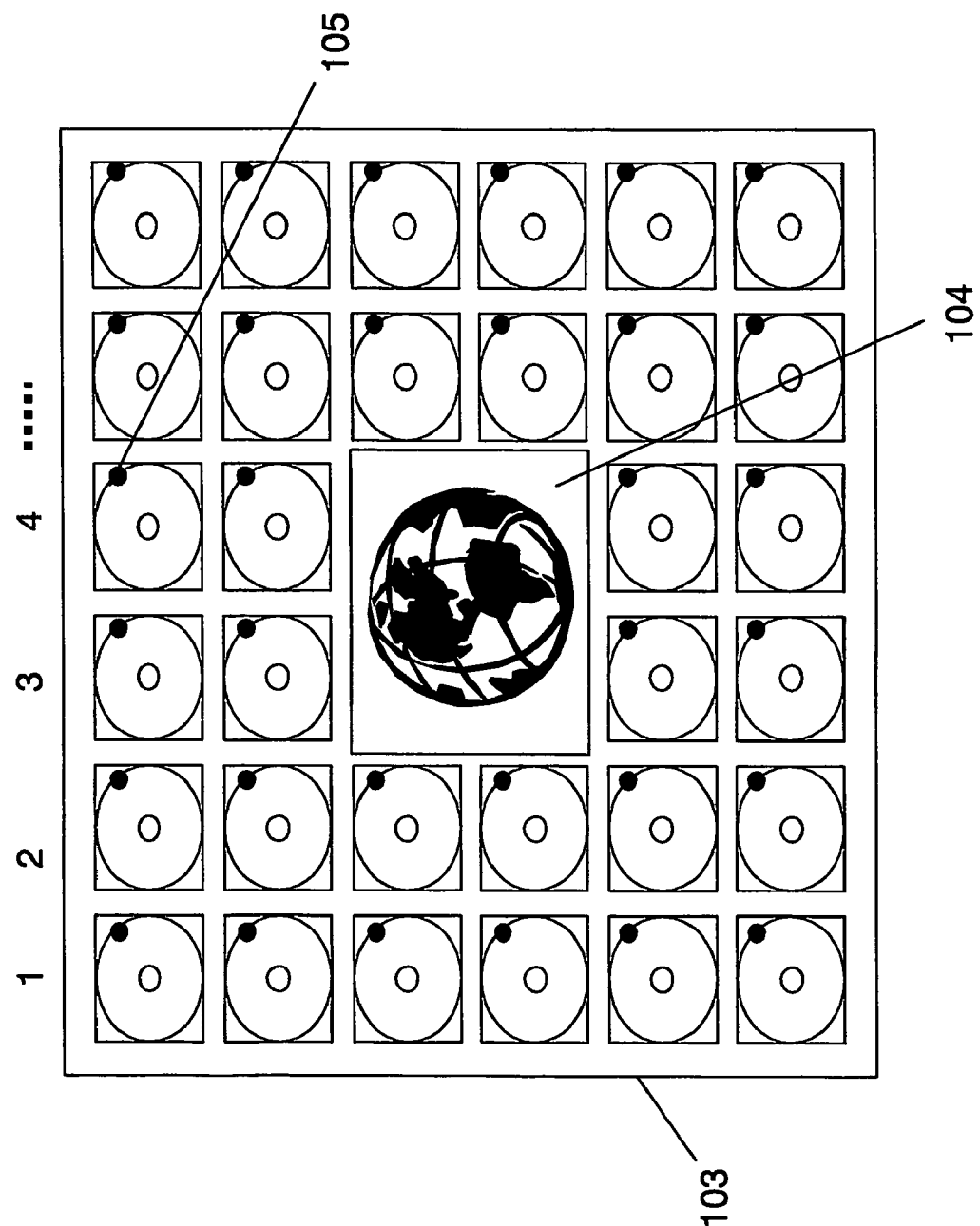
Figure 4:
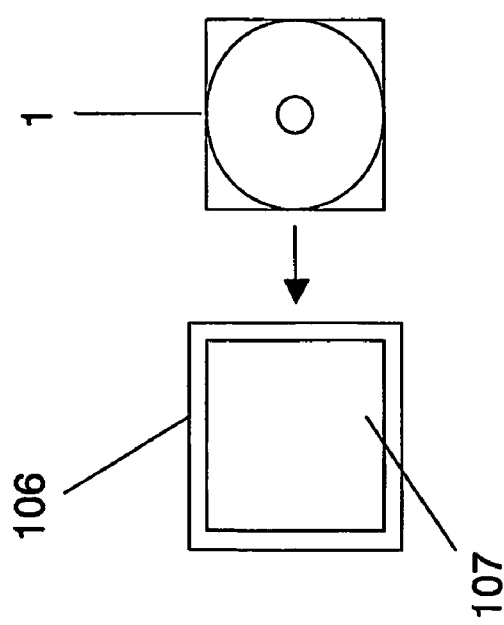

FIG. 3 shows yet another embodiment of an item identification system according to the invention, wherein an item holder is arranged with a displaying device for presentation of the item identification; and FIG. 4 shows a further embodiment of an item identification system according to the invention, wherein a slipcase is arranged with a displaying device for presentation of the item identification.

Figure 1:
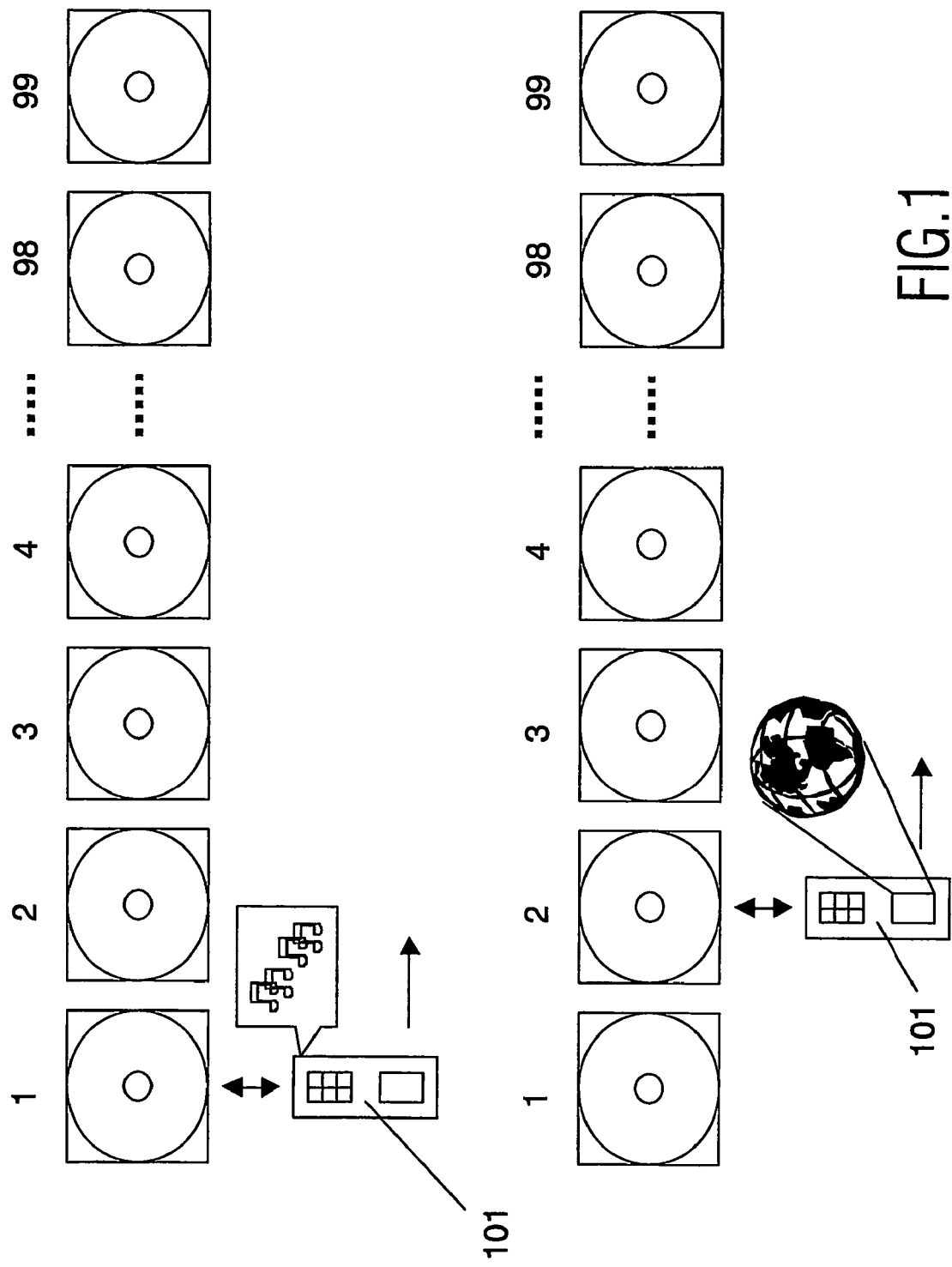
FIG. 1 shows an embodiment of an item identification system according to the invention, wherein the RF detector is arranged with presentation means.

FIG. 1 shows an embodiment of an item identification system according to the invention. A number of RF tagged items 1, 2, 3, 4, . . . , 98, 99 is scanned by an RF detector 101 by moving the detector past the items. The detector transmits a scan signal, and RF contact is established with a tagged item. The chip embedded in the tag sends a response signal to the detector. The response signal comprises some kind of information associated with the item item. This information is e.g. in its simplest form just a number, say "12". In the RF detector, a unique item identifier corresponding to this certain number has been stored. If the detector is equipped with loudspeakers, the detector can provide an audio output, as is the case when the detector reads item 1 in FIG. 1. Assuming that "12" is read from the tag, the RF detector maps this number to a unique identifier. The unique identifier can be in the form of a tune, for example an Elvis tune if item 1 comprises Elvis material. The tune is then presented to the detector user via the detector loudspeaker.

Continuing to scan the items, when the detector establishes contact with item 2, another number is read, for example "23". In the RF detector, a unique item identifier corresponding to "23" has been stored. The number "23" is mapped against the corresponding unique identifier. In case the RF detector comprises some displaying means, the detector can provide a visual output, as is the case when the detector reads item 2 in FIG. 1. Assuming that item 2 is a CD containing an electronic atlas, the unique identifier corresponding to the tag attached to item 2 could comprise a graphic representation of a terrestrial globe. This representation is presented to the user via the displaying means, and the user can identify item 2.

The fact that the RF detector 101 comprises stored unique item identifiers implies that the detector includes some type of interface through which the unique identifiers is stored. A man skilled in the art realizes that this interface can, for example, be an RF, IR or a wire interface etc.

As for the tag, it is not necessarily attached to the item or to the item casing, it could also be embedded in the item itself i.e. according to the chip-in-disc principle.

Figure 2:
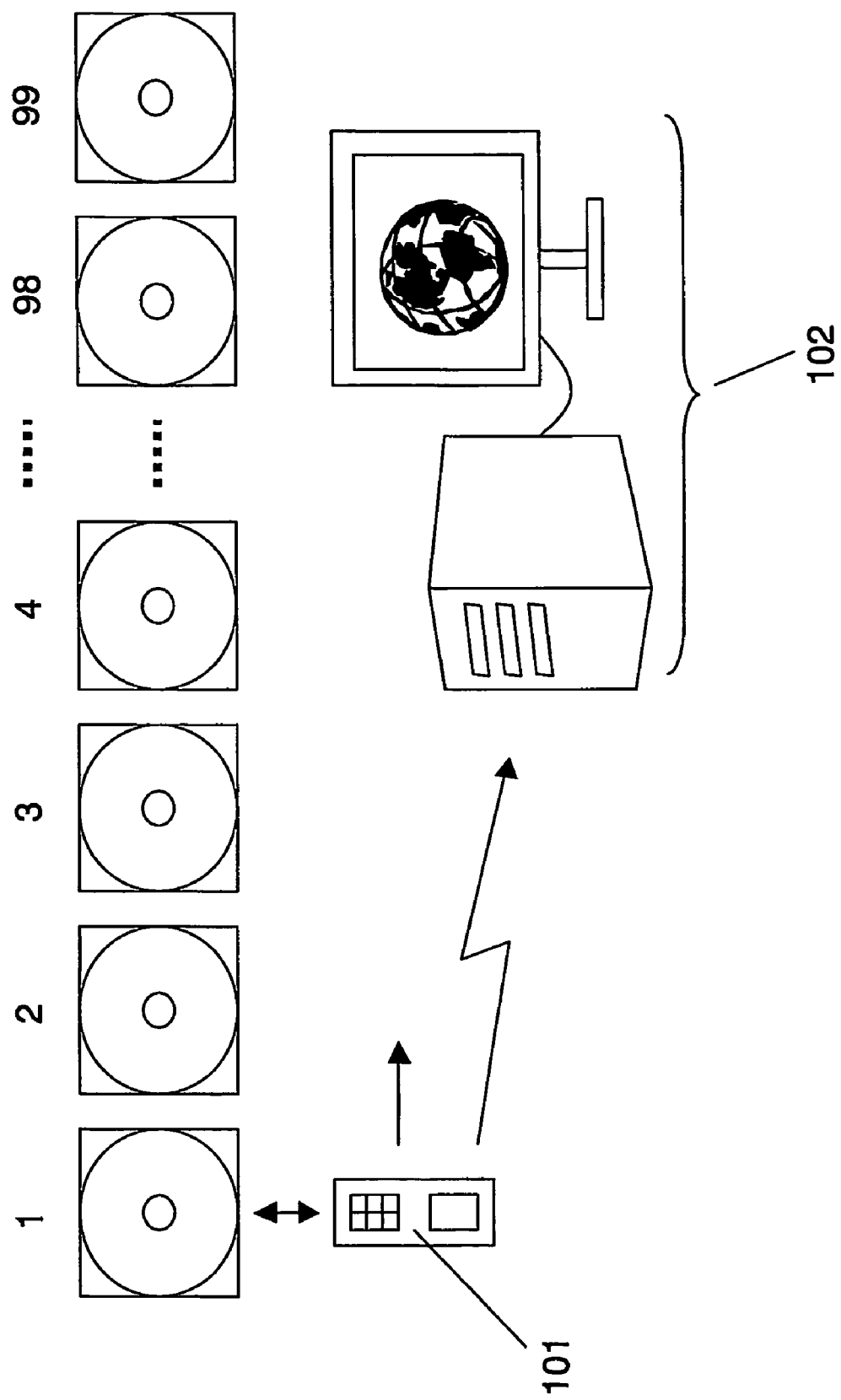
FIG. 2 shows another embodiment of an item identification system according to the invention, wherein the RF detector is connected to a computer acting as a presentation means.

FIG. 2 shows another embodiment of an item identification system according to the invention. As in FIG. 1, a number of RF tagged items 1, 2, 3, 4, . . . , 98, 99 is scanned by an RF detector 101 by moving the detector past the items. The detector transmits a scan signal, and RF contact is established with a tagged item. The chip embedded in the tag sends a response signal to the detector. However, in this embodiment, the RF detector is not equipped with loudspeaker or displaying means, making the detector less complex and less expensive to produce. Instead, the detector is connected, via for example an RF, IR or a wire interface to a computer 102 acting as a presentation means. In this embodiment, the RF detector merely acts as an interface between any of the tagged items 1, 2, 3, 4, . . . , 98, 99 and the computer 102, and the actual mapping of the tag information to the unique identifier is performed in the computer. It is to be understood that the computer could consist of a mobile phone, a PDA or the like with computing facilities.

When sweeping the items 1, 2, . . . , 98, 99 with the detector 101, a list could be generated including the information stored by the tag attached to each item. The information stored by each tag is mapped against the corresponding unique identifier, wherein a list comprising the identified items could be presented to the user on the computer 102. This is of course also possible if the detector 101 itself presents the items as in FIG. 1. This enables a quick sweep of the detector scanning each item, and afterwards the items could be presented in succession.

FIG. 3 shows yet another embodiment of an item identification system according to the invention. In this embodiment, a number of RF tagged items 1, 2, 3, 4, . . . is placed in a holder 103, which holder is arranged with a displaying device 104. Each item is placed in a separate slot in the holder. Each slot is equipped with an RF detector and some selecting means, for example a push button 105, for selecting a specific slot. When a button 105 on a certain slot is pushed, the tag information corresponding to the item 4 housed in that slot is transferred to the displaying device 104, which device is equipped with a memory and a processor. As in the embodiments described earlier, the information comprised in the tag is mapped by the processor to a unique item identifier stored in the memory. Assume that a CD containing an electronic atlas is housed in the slot that corresponds to the pressed button. The unique identifier corresponding to this item 4 could then comprise a graphic representation of a terrestrial globe. This representation is presented to the user via the displaying device 104, and the user can identify the selected item 4.

FIG. 4 shows a further embodiment of an item identification system according to the invention. In this embodiment, an RF tagged item 1 is placed in a slipcase 106, which slipcase is arranged with an RF detector. The slipcase is also arranged with a displaying device 107 comprising a memory and a processor. When the item 1 is placed in the slipcase 106, RF contact is established between the RF detector and the tag. The tag information is transferred to the displaying device 107. As in the embodiments described earlier, the information comprised in the tag is mapped by the processor to a unique item identifier stored in the memory. Assuming that a CD containing an electronic atlas is placed in the slipcase, the unique identifier corresponding to this item 1 could comprise a graphic representation of a terrestrial globe. This representation is presented to the user via the displaying device 107, and the user can identify the item 1.

Even though the invention has been described with reference to specific exemplifying embodiments thereof, many different alterations, modifications and the like will become apparent for those skilled in the art. The described embodiments are therefore not intended to limit the scope of the invention, as defined by the appended claims.

The invention claimed is:

1. A method for identifying an item to which a radio frequency tag is attached by means of a radio frequency tag detector, wherein radio frequency contact is established between the tag and the detector and information identifying the item and being stored by the tag is received by the detector, the method being characterized in that it comprises the steps of:

mapping a unique item identifier against the information stored by the tag and received by the detector; and presenting the unique item identifier for a user of the detector, the method further comprising housing items to which a radio frequency tag is attached in a holder, wherein the holder includes a plurality of slots, each slot comprising a radio frequency detector and a selecting means for indicating to a first means which item is to be identified and presented by a second means, the holder being arranged with a displaying device comprising said first means and said second means.

2. The method according to claim 1, wherein the unique item identifier comprises an audio signal.

3. The method according to claim 1, wherein the unique item identifier comprises a displayable signal.

4. The method according to claim 1, further comprising the step of:

generating a list of the information identifying each item and presenting the unique item identifier corresponding to the information stored by the tag attached to each item to a user.

5. A system for identifying an item to which a radio frequency tag is attached, the system comprising a radio frequency tag detector arranged to establish radio frequency contact with the tag and being arranged to receive information stored by the tag identifying the item, the system being characterized in that it comprises:

a first means arranged to map a unique item identifier against the information stored by the tag and received by the detector; and a second means arranged to present the unique item identifier for a user of the detector, further including a holder comprising a plurality of slots in which items can be housed, each slot comprising a said radio frequency detector and a selecting means for indicating to said first means which item is to be identified and presented by said second means, the holder being arranged with a displaying device comprising said first means and said second means.

6. The system according to claim 5, wherein the unique item identifier comprises an audio signal.

7. The system according to claim 5, wherein the unique item identifier comprises a displayable signal.

8. The system according to claim 5, wherein said radio frequency detector, said first means and said second means is comprised in a slipcase in which said item can be housed.

9. The system according to claim 5, further comprising:

a third means arranged to generate a list of the information identifying each item and arranged to present the unique item identifier corresponding to the information stored by the tag attached to each item to a user.

10. A method for identifying an item to which a radio frequency tag is attached by means of a radio frequency tag detector, wherein radio frequency contact is established between the tag and the detector and information identifying the item and being stored by the tag is received by the detector, the method being characterized in that it comprises the steps of:

mapping a unique item identifier against the information stored by the tag and received by the detector; and presenting the unique item identifier for a user of the detector, the method further comprising housing items to which a radio frequency tag is attached in a holder, wherein the holder includes at least one radio frequency detector and a selecting means for indicating to a first means which item is to be identified and presented by a second means, the holder being arranged with a displaying device comprising said first means and said second means.

11. The method according to claim 10, wherein the unique item identifier comprises an audio signal.

12. The method according to claim 10, wherein the unique item identifier comprises a displayable signal.

13. The method according to claim 10, further comprising the step of:

generating a list of the information identifying each item and presenting the unique item identifier corresponding to the information stored by the tag attached to each item to a user.

14. A system for identifying an item to which a radio frequency tag is attached, the system comprising a radio frequency tag detector arranged to establish radio frequency contact with the tag and being arranged to receive information stored by the tag identifying the item, the system being characterized in that it comprises:

a first means arranged to map a unique item identifier against the information stored by the tag and received by the detector; and a second means arranged to present the unique item identifier for a user of the detector, further including a holder in which items can be held, the holder comprising at least one said radio frequency detector and a selecting means for indicating to said first means which item is to be identified and presented by said second means, the holder being arranged with a displaying device comprising said first means and said second means.

15. The system according to claim 14, wherein the unique item identifier comprises an audio signal.

16. The system according to claim 14, wherein the unique item identifier comprises a displayable signal.

17. The system according to claim 14, wherein said radio frequency detector, said first means and said second means is comprised in a slipcase in which said item can be housed.

18. The system according to claim 14, wherein said holder further comprises a plurality of slots in which items can be housed, each slot comprising a said radio frequency detector and a selecting means for indicating to said first means which item is to be identified and presented by said second means.

19. The system according to claim 14, further comprising:

a third means arranged to generate a list of the information identifying each item and arranged to present the unique item identifier corresponding to the information stored by the tag attached to each item to a user.

* * * * *